(12) United States Patent
Munzert et al.

(10) Patent No.: US 11,588,647 B2
(45) Date of Patent: Feb. 21, 2023

(54) METHOD AND VALIDATION DEVICE FOR VALIDATING A DIGITAL CERTIFICATE

(71) Applicant: Siemens Gamesa Renewable Energy A/S, Brande (DK)

(72) Inventors: Michael Munzert, Gräfelfing (DE); David von Oheimb, Heimstetten (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 6 days.

(21) Appl. No.: 16/762,385

(22) PCT Filed: Nov. 6, 2018

(86) PCT No.: PCT/EP2018/080224
§ 371 (c)(1),
(2) Date: May 7, 2020

(87) PCT Pub. No.: WO2019/091935
PCT Pub. Date: May 16, 2019

(65) Prior Publication Data
US 2020/0358623 A1    Nov. 12, 2020

(30) Foreign Application Priority Data
Nov. 8, 2017    (EP) .................................... 17200512

(51) Int. Cl.
*H04L 9/32* (2006.01)
*H04L 9/40* (2022.01)
(52) U.S. Cl.
CPC ........ *H04L 9/3263* (2013.01); *H04L 63/0428* (2013.01)
(58) Field of Classification Search
None
See application file for complete search history.

(56) References Cited

U.S. PATENT DOCUMENTS 5,261,002 A    11/1993    Perlman et al.
7,730,297 B1 *  6/2010    Pravetz ................. H04L 51/00
                                               713/152

(Continued)

FOREIGN PATENT DOCUMENTS

DE    102014203813 A1    9/2015
WO    2008130191 A1    10/2008
WO    2017121602 A1    7/2017

OTHER PUBLICATIONS

Extended European Search Report in related European Patent Application No. 17200512.6, dated May 14, 2018. 8 pages.

(Continued)

*Primary Examiner* — Brandon Hoffman
(74) *Attorney, Agent, or Firm* — Schmeiser, Olsen & Watts LLP

(57) ABSTRACT

Provided is a method for validating a predetermined digital certificate having a validation device, wherein the validation device stores approval information that specifies which digital certificates of a plurality of digital certificates are permissible digital certificates, and wherein the validation device further stores trust information which indicates a trust level of the permissible digital certificates. The method includes determining, while taking account of the approval information, whether the predetermined digital certificate is permissible for the planned use under the current conditions; and if it is determined that the predetermined digital certificate is permissible, determining the trust level of the predetermined digital certificate by taking into consideration the trust information for the planned use and the current conditions, is provided. A trust level can be determined for a digital certificate which indicates how trustworthy the digital certificate is for a planned use under the current conditions.

14 Claims, 3 Drawing Sheets

(56) References Cited

U.S. PATENT DOCUMENTS

Figure 1:
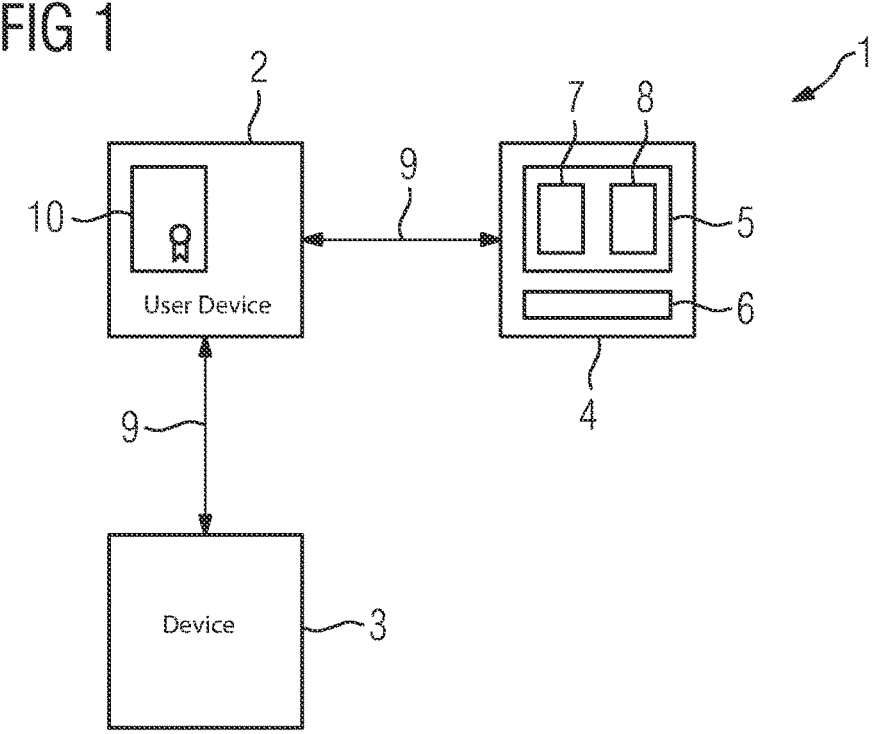

| | | | |
|---|---|---|---|
| 9,992,029 B1* | 6/2018 | Jackson | H04L 63/0428 |
| 2005/0228998 A1* | 10/2005 | Chan | H04L 9/3268 |
| | | | 713/175 |
| 2006/0294384 A1 | 12/2006 | Fukumizu | |
| 2007/0261124 A1* | 11/2007 | Centonze | G06F 21/6227 |
| | | | 726/27 |
| 2013/0166907 A1* | 6/2013 | Brown | H04L 9/3265 |
| | | | 713/156 |
| 2014/0281503 A1* | 9/2014 | Mills | H04L 63/0823 |
| | | | 713/157 |
| 2015/0186669 A1* | 7/2015 | Nicolaou | G06F 21/53 |
| | | | 726/4 |
| 2016/0149900 A1 | 5/2016 | Justin et al. | |
| 2017/0180354 A1 | 6/2017 | Falk et al. | |
| 2019/0028466 A1 | 1/2019 | Falk et al. | |

OTHER PUBLICATIONS

International Search Report and Written Opinion in related PCT Patent Application No. PCT/EP2018/080224, dated Feb. 5, 2019. 14 pages.

* cited by examiner

METHOD AND VALIDATION DEVICE FOR VALIDATING A DIGITAL CERTIFICATE

CROSS-REFERENCE TO RELATED APPLICATIONS

This application is a national stage entry of PCT Application No. PCT/EP2018/080224, having a filing date of Nov. 6, 2018, which claims priority to European Patent Application No. 17200512.6, having a filing date of Nov. 8, 2017, the entire contents of which are hereby incorporated by reference.

FIELD OF TECHNOLOGY

The following relates to a method for validating a predetermined digital certificate and to a validation device for validating the predetermined digital certificate.

BACKGROUND

A digital certificate may be assigned to a certificate holder, for example a machine, a field device or a controller. The digital certificate of the certificate holder is used for example to encrypt data that are transmitted by a further device (user device) to the certificate holder, or to verify digital signatures of the certificate holder using a further device (user device). Before it is used by the user device, it is often necessary to validate the digital certificate of the certificate holder.

For this purpose, the user device may query a trust store. The trust store specifies in particular which certification authorities, in particular root certification authorities, issue digital certificates that are permissible or trustworthy from the point of view of the user device or indirectly certify the issuance through intermediate certification authorities. If the digital certificate to be validated was created by a certification authority that directly or indirectly creates trustworthy certificates according to the trust store, the digital certificate is able to be validated.

Document WO 2017/121602 A1 discloses a method for checking a security classification of a first device by way of an associated digital certificate. The method comprises the steps of: transmitting the digital certificate with an identifier of a security classification from the first device to a second device, checking the identifier of the security classification against a predefined security rule by way of the second device, and carrying out security measures according to the check result of the security rules.

Document WO 2008/130191 A1 discloses a method for using content taking into account security levels, in which a device security level is generated, contents are obtained, and the contents are used if the device security level is above a minimum permissible device security level.

Document U.S. Pat. No. 5,261,002 A comprises a method for issuing and revoking user authorization certificates in a cryptographic system.

Document US 2006/0294384 A1 discloses an information processing device for storing information that has an expiry date. The information is replaced with new information following the expiry date.

Against this background, one aspect of the embodiment of the present invention is to provide improved validation of a predetermined digital certificate.

SUMMARY

An aspect relates to a method for validating a predetermined digital certificate using a validation device. The validation device stores permission information that specifies which digital certificates from a multiplicity of digital certificates are permissible digital certificates. The validation device furthermore stores trust information that specifies a trust level of the permitted digital certificates. The method comprises:

determining, taking into account the permission information, whether the predetermined digital certificate is permissible; and if it is determined that the predetermined digital certificate is permissible, determining the trust level of the predetermined digital certificate taking into account the trust information, in particular for a particular use.

The validation device may be designed as a storage device. It may be implemented on a computer, in particular as part of an industrial network. The validation device stores for example the permission information and the trust information Validation of a digital certificate is understood in particular to mean that the digital certificate is verified and that it is confirmed that the certificate is trustworthy enough for a particular use.

The permission information is in particular information that specifies, for at least one digital certificate, whether this certificate is generally permissible, for example with regard to the issuing certification authority or to a validity time period of the certificate. The permission information may for example specify which certification authorities create permissible certificates from the point of view of the user device. Each digital certificate contains an identification of the certification authority that created the digital certificate. Taking into account the information about the certification authority of a digital certificate, it is then in particular possible to derive whether or not this digital certificate is permissible.

The permissibility of a digital certificate is in particular binary information: either the digital certificate is permissible, or it is not.

The trust information in particular specifies a trust level for permitted digital certificates. The trust level of a digital certificate may specify how trustworthy the digital certificate is. By way of example, the trust information comprises a plurality of trust levels. The permitted digital certificates may in particular be divided into a plurality of trust levels or trust categories on the basis of the trust information. It is possible for example to distinguish between three trust levels, which respectively specify a low, a medium and a high trustworthiness of a particular permitted digital certificate.

The predetermined digital certificate is in particular a digital certificate that needs to be validated. The digital certificate is also referred to only as "certificate" below. The certificate may be a public key certificate in accordance with the X.509 standard that comprises a public key. The certificate may also be an attribute certificate.

The certificate may be received by a user device from a device to which the certificate is assigned. The user device wishes in particular to verify and validate the received certificate in order to securely use the validated certificate, for example in order to check digital signatures received from the device and/or in order to encrypt data for the device using the public key stored in the certificate.

The user device may query the validation device in order to validate the certificate. It is also possible for the user device to task the validation device with the validation. The validation device may also be part of the user device.

The permission information makes it possible in particular to determine whether the certificate to be verified is permissible. The permission information may for example be used to determine whether a certificate is fundamentally impermissible. This is the case for example when the certificate has been created by a certification authority that is not trustworthy, or if the validity period of the certificate has already elapsed. The permission information thus makes it possible in particular to predetermine the permissibility of the certificate.

If it is determined, on the basis of the permission information, that the certificate is permissible, the trust information may be used for example to obtain more detailed information about the certificate. The trust information is used in particular to assign the certificate a trust level that specifies how trustworthy the certificate is for one or more types of use.

In some embodiments, the permission information and the trust information are stored together. By way of example, the permission information and the trust information may together form one or more trust stores that specify how trustworthy which certificates are. The trust stores formed by the permission information and the trust information specify in particular not only whether or not a certificate is permissible, but furthermore how reliable or trustworthy the certificate is for particular types of use on the basis of the trust level.

It is in particular possible to obtain more information about the trustworthiness of digital certificates, because the validation device comprises trust information for specifying the trust level of the certificate. The validation device may in particular use the determined trust level to make a general statement about the trustworthiness of the certificate.

It may for example be recognized to what extent a certificate is able to be trusted. Through knowledge of the trust level, it is possible for example to gain a better understanding of the certificate, and it is possible, in particular taking into account the trust level, to correctly determine whether or not a certificate should be validated. Validating the certificate is in particular more reliable and refined, as a result of which the overall security and/or flexibility of the user device is able to be increased.

According to one embodiment, the method furthermore comprises:
  if it is determined that the trust level of the predetermined digital certificate is at or above a predetermined trust level (for the planned type of use), validating the predetermined digital certificate. The validation is in particular a successful validation.

The predetermined trust level may be predefined by the user device. The predetermined trust level is in particular a minimum trust level for which the reliability of the certificate is considered to be sufficient to validate the certificate for a planned type of use. The validation may be performed for example by the validation device or by the user device.

In some embodiments, the method furthermore comprises rejecting the certificate if it is determined that the trust level of the predetermined digital certificate is below the trust level predetermined for the planned type of use. In this case, the certificate is not validated and then also not used by the user device.

According to a further embodiment, the method furthermore comprises:
  using the validated digital certificate to verify data that are received from a predetermined device in order to encrypt data that are transmitted to the predetermined device (the certificate holder), and/or in order to check a digital signature of the predetermined device.

In some embodiments, the digital certificate is used only if it has been validated successfully. The digital certificate is in particular used by the user device. The data may be verified and/or encrypted using the public key of the validated certificate. The predetermined device may be the device to which the certificate is assigned.

According to a further embodiment, the validation device stores different permission information and/or different trust information for different uses of a digital certificate.

A use of the certificate may also be understood to mean an application of the certificate. The different uses in particular specify how the validated certificate should be used. By way of example, the different uses may specify different use environments, different types of application, different devices using the certificate and the like.

Different permission information and/or different trust information may be stored in the validation device for the different uses. As a result, an even more precise and more flexibly usable trust level is in particular able to be obtained for the certificate, because the trust level may be dependent on the use of the certificate.

According to a further embodiment, the method furthermore comprises:
  providing use information that specifies a planned use of the predetermined digital certificate, to the validation device;
  determining, taking into account the permission information relevant to the use information, whether the predetermined digital certificate is permissible;
  if it is determined that the predetermined digital certificate is permissible, determining the trust level of the predetermined digital certificate taking into account the use information.

The use information may in particular specify how the validated certificate is intended to be used, for example in which environment. The environment is for example a secure environment, such as a control device of an industrial network. The environment may also be a less secure environment, such as for example an outsourced production facility.

The use information may also predefine the predetermined trust level, that is to say the trust level that would be acceptable for the planned use. Other use-related information may also be part of the use information. The use information may be provided to the validation device by the user device.

The use information allows the validation device in particular to select that permission information and possibly that trust information that is relevant to the planned use. Depending on the planned use of the certificate, different permission information and trust information may be queried and/or used.

The trust level of the certificate is determined in particular depending on the planned use. Depending on which use is planned for the certificate, this may or may not be permitted, and may also have different trust levels. The same certificate is not necessarily always validated or not validated. Instead of this, the validation of the certificate depends on the planned use.

If the use information for example specifies that the certificate is intended to be used in a less secure production facility, it may be determined that the certificate has a sufficient trust level and should be validated. If the same certificate is however intended to be used in a secure control device environment, it may be determined that the certificate does not have a sufficient trust level for the planned use. Different trust levels may be determined for different applications/uses of a single certificate. As a result, the security of the environment in which the certificate is intended to be used is for example able to be guaranteed.

The validation device in particular specifies not only a general trust level for the certificate, but also a use-specific trust level. Due to the fact that the trust level is able to be determined in a use-specific manner, the validation of the certificate is particularly flexible.

According to a further embodiment, the method furthermore comprises:
  querying the use information by way of the validation device.

The validation information may require further information about the certificate upon receiving a request regarding the permissibility and/or regarding the trust level of the certificate. In this case, the validation device may for example ask the user device for the use information of the certificate.

According to a further embodiment, the method furthermore comprises:
  providing the determined trust level of the predetermined digital certificate to a
  requesting device that requests validation of the digital certificate, and/or to a user.

The requesting device is in particular the user device. The trust level may be provided to the requesting device and/or to the user so that the latter is able to decide whether the trust level is sufficient to successfully validate the certificate. The user device may for example successfully validate the certificate automatically if the received trust level is higher than the predetermined trust level.

According to a further embodiment, the method furthermore comprises:
  generating a certificate chain containing a plurality of predetermined certificates; determining whether the trust level of the respective predetermined digital certificates is at or above the predetermined trust level; and
  validating the entire certificate chain if it is determined that the trust level of the respective predetermined digital certificates is at or above the predetermined trust level.

The certificate chain is in particular a list of a plurality of interlinked digital certificates. The certificate chain comprises in particular a root certificate that was created by a root certification authority that is deemed to be trustworthy in a certain manner according to the information in the trust store, and a plurality of intermediate certificates that were created by intermediate certification authorities. Apart from the root certificate, any of the certificates in the certificate chain may reject the previous certificate in the certificate chain.

Different certificates in the certificate chain may have different levels of trustworthiness and therefore different trust levels. If all of the certificates in a certificate chain are intended to be validated, the user device may provide the validation device with information about the structure of the certificate chain. This information is for example part of the use information.

In order to validate the certificate chain, each individual certificate in the certificate chain is in particular checked. By way of example, it is first of all checked whether the root certificate is permissible with regard to the root certification authorities and permission information stored in the trust store. If it is determined that the root certificate is permissible and has a sufficient trust level, all of the certificates in the certificate chain may be checked in succession. When checking the respective certificates in the certificate chain, it may be checked whether a respective certificate is permissible taking into account the permission information and whether it has a sufficient trust level taking into account the trust information.

If an overall trust level that results from the trust levels of all of the certificates in the chain, that is to say for example all of the certificates in the certificate chain are determined as permissible and have a sufficient minimum trust level, the entire certificate chain is in particular determined as permissible and all of the certificates in the certificate chain are validated successfully.

The certificate chain is in particular validated successfully only if all of the certificates in the certificate chain have a sufficient trust level. Due to the fact that a single trust level is determined for each of the certificates in the certificate chain, it is possible to achieve an improved estimation of the trustworthiness of the certificate chain, as a result of which the security of the system in which the certificate chain is intended to be used is able to be guaranteed.

According to a further embodiment, the method furthermore comprises:
  changing the permission information and/or the trust information.

Changing the permission information and/or the trust information may also be considered to be updating the permission information and/or the trust information. The permission information and/or trust information may for example be changed when it is out of date.

The permission information and/or the trust information may also be changed dynamically. In some embodiments, the permission information and/or the trust information is not stored statically in the validation device. Instead of this, the permission information and/or the trust information may be generated dynamically. Due to the fact that the permission information and/or the trust information is changed, the trust level is able to be determined with greater precision. The certificate is thus able to be validated particularly flexibly.

According to a further embodiment, the permission information and/or the trust information is changed depending on a current application situation, information about the requesting device, information about a certificate holder and/or information about a use context.

The permission information and/or the trust information may be changed and/or dynamically generated taking into account current embodiment. By way of example, the permission information and/or the trust information may be changed with regard to a user of the user device. It is also possible to change the permission information and/or the trust information if the user device and/or the device of the certificate holder is in a particular country. By way of example, a certification authority is classified as being permissible on the basis of the permission information only when the device of the certificate holder is currently in the same country as the user device and when the certificate is permitted for the country.

Due to the fact that the permission information and/or the trust information is able to be changed depending on current embodiments, the determination of the trust level is able to be more precise and the security of the system that wishes to use the certificate is able to be increased. The certificate is additionally able to be validated particularly flexibly.

According to a further embodiment, the method furthermore comprises:

deactivating part of the permission information and/or of the trust information when
determining whether the predetermined digital certificate is permissible and/or when
determining the trust level of the predetermined digital certificate.

Not all of the permission information and/or trust information is in particular used to determine a permissibility of the certificate and/or to determine the trust level. By way of example, part of the permission information and/or of the trust information may be deactivated if a particular user uses the user device and/or wishes to validate the certificate. As a result, the determined permissibility and the determined trust level may for example vary depending on the user, and flexibility of the validation of the certificate is additionally able to be increased.

According to a second aspect, what is proposed is a validation device for validating a predetermined digital certificate. The validation device comprises:
  a storage unit for storing permission information and trust information, wherein the permission information specifies which digital certificates from a multiplicity of digital certificates are permissible digital certificates, and wherein the trust information specifies a trust level of the permitted digital certificates; and
  a determination unit for determining, taking into account the permission information, whether the predetermined digital certificate is permissible, and for determining the trust level of the predetermined digital certificate taking into account the trust information, if the determination unit has determined that the predetermined digital certificate is permissible.

The storage unit and/or the determination unit may each be implemented in the form of hardware and/or also in the form of software. In the case of an implementation in the form of hardware, the respective unit may be designed as an apparatus or as part of an apparatus, for example as a computer or as a microprocessor or as a control computer of a vehicle. In the case of an implementation in the form of software, the respective unit may be designed as a computer program product (non-transitory computer readable storage medium having instructions, which when executed by a processor, perform actions), as a function, as a routine, as part of a program code or as an executable object.

According to one embodiment, the validation device is suitable for performing the method according to the first aspect or according to one embodiment of the first aspect. The embodiments and features described for the proposed method apply accordingly to the proposed validation device.

According to a third aspect, what is proposed is a computer program product that prompts the performance of the method according to the first aspect or according to one embodiment of the first aspect on a program-controlled device.

A computer program product, such as for example a computer program means, may be provided or supplied for example in the form of a storage medium, such as for example a memory card, USB stick, CD-ROM, DVD or else in the form of a downloadable file from a server in a network. This may take place for example in a wireless communication network by transmitting a corresponding file containing the computer program product or the computer program means.

According to a fourth aspect, what is proposed is a system for validating a predetermined digital certificate, having a validation device according to the second aspect or according to one embodiment of the second aspect and a requesting device that requests validation of the digital certificate.

Further possible implementations of the embodiment of the invention also comprise combinations of features or embodiments that are described above or below with reference to the exemplary embodiments, which combinations are not cited explicitly. A person skilled in the art will in the process also add individual aspects to the respective basic form of the embodiment of the invention as improvements or additions.

BRIEF DESCRIPTION

Figure 2:
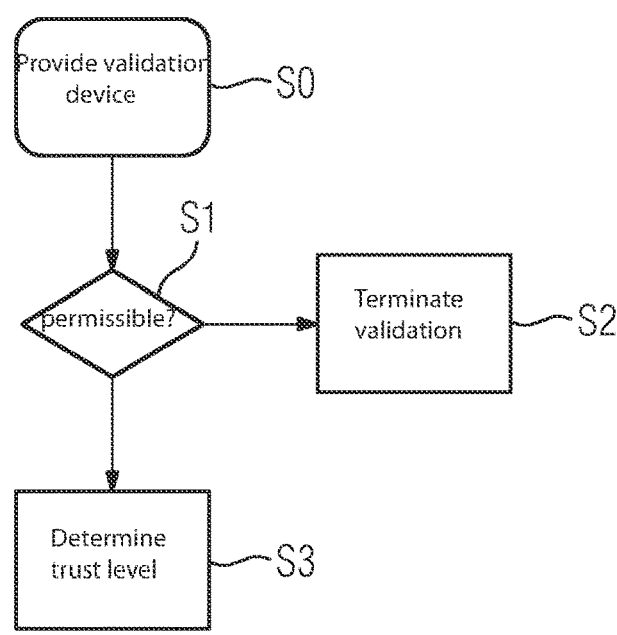
Figure 3:
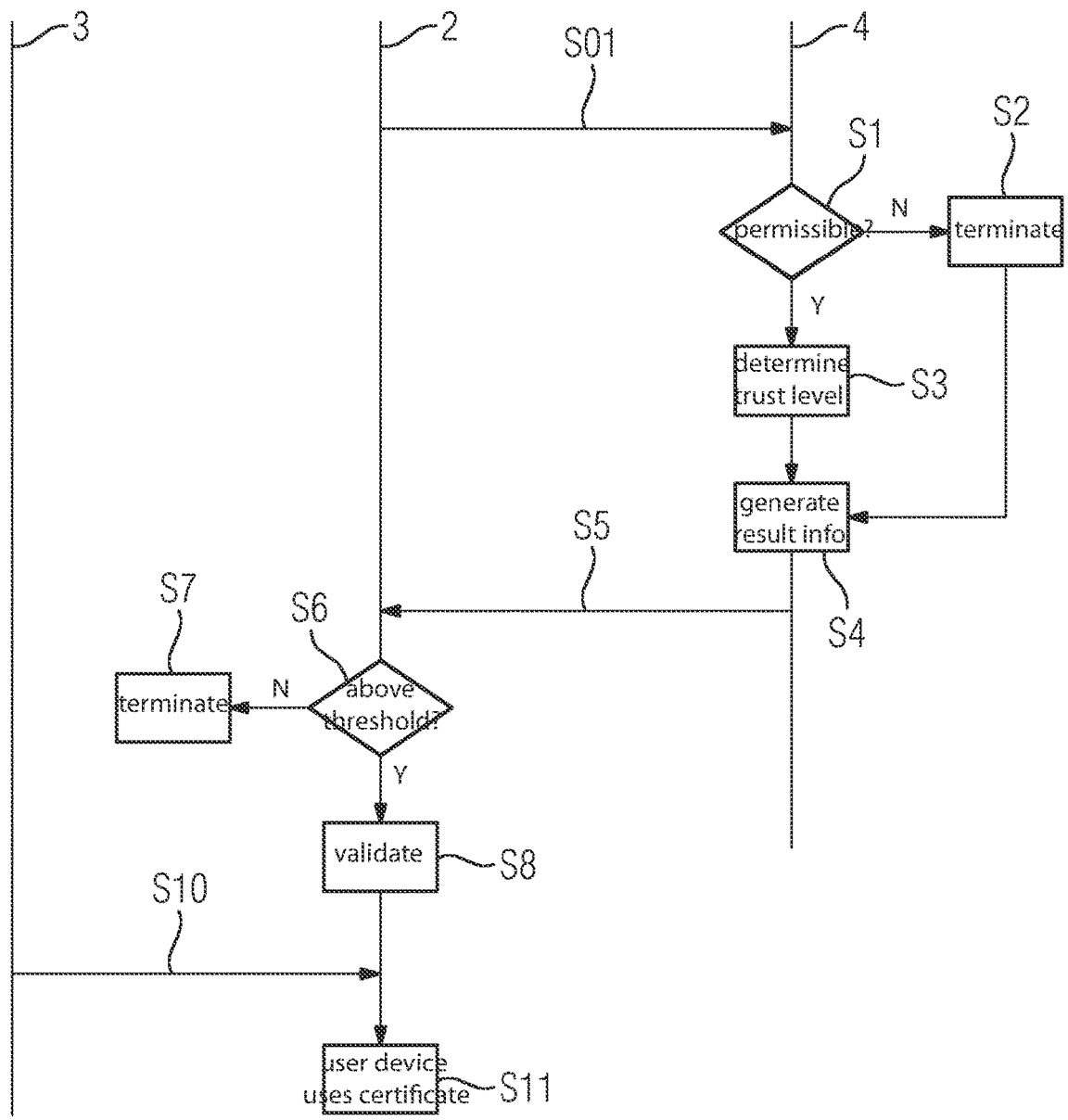
Figure 4:
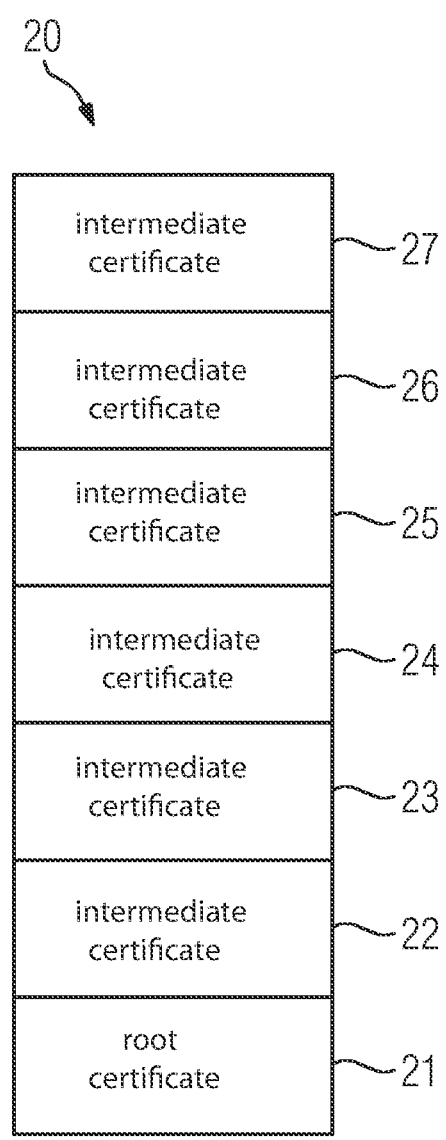

Some of the embodiments will be described in detail, with references to the following Figures, wherein like designations denote like members, wherein:
FIG. 1 depicts an example of a system for validating a predetermined digital certificate;
FIG. 2 depicts a method for validating a predetermined digital certificate according to a first embodiment;
FIG. 3 depicts a method for validating a predetermined digital certificate according to a second embodiment; and
FIG. 4 depicts an example of a certificate chain.

DETAILED DESCRIPTION

FIG. 1 shows an example of a system 1 for validating a predetermined digital certificate 10. The system 1 is part of an industrial network. It comprises a user device 2, a device 3 as certificate holder and a validation device 4. The certificate holder 3 and the validation device 4 are each coupled in terms of communication to the user device 2 by way of cables 9.

The certificate holder 3 is that device for which the certificate 10 was issued. The certificate 10 is thus assigned to the device 3. The device 3 is a control device of the industrial network that provides its data to the user device 2. The device 3 provides its certificate 10 to the user device 2 so that said user device is able to use said certificate to decrypt the data, for example. The user device 2 has to validate the certificate 10 before it is able to be used.

In order to validate the certificate 10, the user device 10 may use the validation device 4. This is described with reference to FIG. 2, which shows a method for validating a digital certificate 10 according to a first embodiment.

In a preparation step S0, the validation device 4 that is illustrated in FIG. 1 is provided. The validation device 4 comprises a storage unit 5 that is implemented for example in the form of files on a hard disk, and a determination unit 6 that is implemented for example in the form of a processor. Permission information 7 and validation information 8 are stored in the storage unit 5. The permission information 7 and the validation information 8 together form a multiplicity of trust stores by way of which it is possible to determine a trust level of the certificate 10.

The permission information 7 for this purpose comprises a list of certification authorities that issue certificates that are considered to be permissible. The validation information 8 furthermore specifies a trust level for each of the permissible certification authorities that issue certificates that are considered to be permissible. A distinction is drawn in this case between three trust levels, these being "low", "medium" and "high".

In step S0, the user device 2 additionally tasks the validation device 4 with validating the certificate 10.

In a step S1, the validation device 4 uses the validation information 7 to determine whether the certificate 10 is permissible. The validation device 4 uses the determination unit 6 to determine the permissibility of the certificate 10. In order to determine the permissibility of the certificate 10, the determination unit 6 checks whether the certificate 10 was issued by a certification authority that is a permissible certification authority according to the validation information 7. If the certificate 10 was actually issued by a certification authority that is a permissible certification authority according to the validation information 7, the validation device 4 determines that the certificate 10 is permissible in step S1.

If it is determined in step S1 that the certificate 10 is permissible, a trust level of the certificate 10 is determined in a step S3, taking into account the trust information 8. The validation device 4 uses the determination unit 6 to determine the trust level of the certificate 10. The determination unit 6 determines the trust level of the certificate 10 by accessing the trust information 8.

If however the certificate 10 was issued by a certification authority that is not a permissible certification authority according to the validation information 7, the validation device 4 determines that the certificate 10 is not permissible in step S1. In this case, the validation of the certificate 10 is terminated with a negative result in a step S2.

In some embodiments, the determination unit 6 then generates result information that specifies whether the certificate 10 was deemed to be permissible in step S1 and which trust level was determined in step S3.

FIG. 3 shows a method for validating a predetermined digital certificate according to a second embodiment. The method from FIG. 3 may also be performed using the system 1 described with reference to FIG. 1.

In step S01, the user device 2 tasks the validation device 4 with determining the permissibility of the certificate 10 and possibly the trust level thereof. For this purpose, the user device 2 transmits a request to the validation device 4 via the cable 9. The request receives further information about the certificate 10, for example use information. The use information specifies the planned use of the certificate 10. The use information in this case specifies that the certificate 10 is intended to be used for validating data that are received from the device 3.

Steps S1-S3 correspond for the most part to steps S1-S3 that were described with reference to FIG. 1, and are therefore not described again. In this case, in steps S2 and S3, the permissibility and the trust level of the certificate 10 are additionally determined taking into account the use information.

In a step S4, the determination unit 6 generates result information. The result information specifies whether the certificate 10 was deemed to be permissible in step S1 and which trust level was determined in step S3.

In a step S5, the result information is transmitted to the user device 2 via the cable 9.

In a step S6, the user device 2 determines whether the determined trust level is above a predetermined trust level. The predetermined trust level is a trust level that is stored beforehand in the user device 2 and specifies which trust levels are acceptable. In this case, the predetermined trust level is "medium". If the trust level determined in step S3 is "medium" or "high", it is determined in step S6 that it is above the predetermined trust level. If the trust level determined in step S3 is "low", however, it is determined in step S6 that it is not above the predetermined trust level.

If it is determined in step S6 that the trust level is lower than the predetermined trust level, the validation of the certificate 10 is terminated with a negative result in a step S7.

If it is determined in step S6 that the trust level is above the predetermined trust level, the certificate 10 is validated positively in a step S8. The validated certificate 10 is stored in the user device 2 in order to be used thereby.

In a step S10, the user device 2 receives data from the device 3. The data are signed with a private key of the device 3.

In a step S11, the user device 2 uses the validated certificate 10. The certificate 10 is used to validate the data received in step S10. For this purpose, the user device 2 uses the public key of the digital certificate 10 to inspect the signature.

FIG. 4 shows an example of a certificate chain 20. The certificate chain 20 comprises a root certificate 21 and intermediate certificates 22-27. The system 1 described with reference to FIG. 1 may also be used to validate all of the certificates 21-27 in the certificate chain 20. For this purpose, the methods according to the first embodiment from FIG. 2 or according to the second embodiment from FIG. 3 may be performed, wherein the certificate chain 20 is used instead of the certificate 10.

In steps S1 and S3, it is checked individually, for each of the certificates 21-27 in the certificate chain 20, whether these are permissible with regard to the permission information 7, the trust information and possibly the use information, and which trust level each certificate 21-27 has. The certificates 21-27 in the certificate chain are validated only if it is determined that all of the certificates 21-27 have a sufficient trust level. The length of the certificate chain 20 is able to be changed. By way of example, the certificate chain 20 may comprise only the certificates 21-23.

Although the present invention has been described with reference to exemplary embodiments, it is able to be modified in many ways. The method steps may also be performed in another order, and steps S1 and S3 may in particular be performed together. The uses of the certificate 10 are not limited to the described uses. It is also possible to dynamically adjust the permission information 7 and the trust information 8 and to jointly take the received use information into account in the inspection of the certificate by the determination unit 6 in the validation device 4. The use information also does not have to be sent to the validation device 4 with the request for validation. Instead of this, the validation device 4 may also query the use information explicitly from the user device 2 or the user device 2 itself may compare the result received from the validation device 4 with the planned type of use. The use information may additionally also comprise other use-specific information.

For the sake of clarity, it is to be understood that the use of "a" or "an" throughout this applications does not exclude a plurality, and "comprising" does not exclude other steps or elements. The mention of a "unit" or a "module" does not preclude the use of m ore than one unit or module.

The invention claimed is:

1. A method for validating a predetermined digital certificate using a validation device, wherein the validation device stores permission information that specifies which digital certificates from a multiplicity of digital certificates are permissible digital certificates, and wherein the validation device furthermore stores trust information that specifies a trust level of the permitted digital certificates, the method comprising:

determining, taking into account the permission information, whether the predetermined digital certificate is permissible; and if it is determined that the predetermined digital certificate is permissible, determining the trust level of the predetermined digital certificate taking into account the trust information; wherein the validation device stores different trust information for different uses of a digital certificate;

wherein the validation device stores different permission information for different uses of a digital certificate.

2. The method as claimed in claim 1, furthermore comprising:

if it is determined that the trust level of the predetermined digital certificate is above a predetermined trust level, validating the predetermined digital certificate.

3. The method as claimed in claim 1, further comprising:
using the validated digital certificate to verify data that are received from a predetermined device in order to encrypt data that are transmitted to the predetermined device, and/or in order to check a digital signature of the predetermined device.

4. The method as claimed in claim 1, further comprising:
providing use information that specifies a planned use of the predetermined digital certificate, to the validation device;
determining, taking into account the permission information relevant to the use information, whether the predetermined digital certificate is permissible;
if it is determined that the predetermined digital certificate is permissible, determining the trust level of the predetermined digital certificate taking into account the use information.

5. The method as claimed in claim 1, further comprising:
querying the use information by way of the validation device.

6. The method as claimed in claim 1, further comprising:
providing the determined trust level of the predetermined digital certificate to a requesting device that requests validation of the digital certificate, and/or to a user.

7. The method as claimed in claim 1, further comprising:
generating a certificate chain containing a plurality of predetermined certificates;
determining whether the trust level of the respective predetermined digital certificates is above the predetermined trust level; and
validating the entire certificate chain if it is determined that the trust level of the respective predetermined digital certificates is above the predetermined trust level.

8. The method as claimed in claim 1, further comprising:
changing the permission information and/or the trust information.

9. The method as claimed in claim 8, wherein the permission information and/or the trust information is changed depending on the current application situation, information about the requesting device, information about a certificate holder and/or information about a use context.

10. The method as claimed in claim 1, further comprising:
deactivating part of the permission information and/or of the trust information when determining whether the predetermined digital certificate is permissible and/or when determining the trust level of the predetermined digital certificate.

11. A computer program product comprising a computer readable hardware storage device having computer readable program code stored therein, said program code executable by a processor of a computer system to implement the method as claimed in claim 1.

12. A validation device for validating a predetermined digital certificate, the validation device comprising:
a storage unit for storing permission information and trust information, wherein the permission information specifies which digital certificates from a multiplicity of digital certificates are permissible digital certificates, and wherein the trust information specifies a trust level of the permitted digital certificates; and
a determination unit for determining, taking into account the permission information, whether the predetermined digital certificate is permissible, and for determining the trust level of the predetermined digital certificate taking into account the trust information, if the determination unit has determined that the predetermined digital certificate is permissible;
wherein the storage unit is configured so as to store different trust information for different uses of a digital certificate;
wherein the validation device stores different permission information for different uses of a digital certificate.

13. The validation device as claimed in claim 12, suitable for performing the method as claimed in claim 1.

14. A system for validating a predetermined digital certificate, having a validation device as claimed in claim 12 and a requesting device that requests validation of the digital certificate.

* * * * *